United States Patent
Polk, Jr.

(10) Patent No.: US 9,844,905 B2
(45) Date of Patent: Dec. 19, 2017

(54) METHOD AND APPARATUS FOR PREPARING A MOLDED ARTICLE

(71) Applicant: LRM Industries International, Inc, Rockledge, FL (US)

(72) Inventor: Dale E. Polk, Jr., Titusville, FL (US)

(73) Assignee: LRM Industries International, LLC, Rockledge, FL (US)

( * ) Notice: Subject to any disclaimer, the term of this patent is extended or adjusted under 35 U.S.C. 154(b) by 96 days.

(21) Appl. No.: 14/405,070

(22) PCT Filed: Jun. 8, 2013

(86) PCT No.: PCT/US2013/044854
§ 371 (c)(1),
(2) Date: Dec. 2, 2014

(87) PCT Pub. No.: WO2013/185120
PCT Pub. Date: Dec. 12, 2013

(65) Prior Publication Data
US 2015/0145181 A1    May 28, 2015

Related U.S. Application Data

(60) Provisional application No. 61/657,738, filed on Jun. 9, 2012.

(51) Int. Cl.
| | |
|---|---|
| *B29C 51/02* | (2006.01) |
| *B29C 51/08* | (2006.01) |
| *B29C 51/26* | (2006.01) |
| *B29C 51/12* | (2006.01) |
| *B29K 101/12* | (2006.01) |
| *B29K 105/06* | (2006.01) |
| *B29K 105/00* | (2006.01) |
| *B29C 47/00* | (2006.01) |

(52) U.S. Cl.
CPC .............. *B29C 51/02* (2013.01); *B29C 51/08* (2013.01); *B29C 51/12* (2013.01); *B29C 51/262* (2013.01); *B29C 47/0019* (2013.01); *B29C 47/0054* (2013.01); *B29C 47/0064* (2013.01); *B29K 2101/12* (2013.01); *B29K 2105/06* (2013.01); *B29K 2105/256* (2013.01)

(58) Field of Classification Search
None
See application file for complete search history.

(56) References Cited

U.S. PATENT DOCUMENTS

| | | |
|---|---|---|
| 5,843,492 A | 12/1998 | McCorry |
| 7,842,225 B2 | 11/2010 | Polk |
| 2005/0040569 A1 | 2/2005 | Fitzell |
| 2008/0258329 A1 | 10/2008 | Polk |
| 2009/0065981 A1 | 3/2009 | Polk, Jr. |
| 2010/0021664 A1 | 1/2010 | Polk et al. |
| 2011/0193253 A1 | 8/2011 | Polk et al. |
| 2011/0277926 A1 | 11/2011 | Polk, Jr. |

*Primary Examiner* — Monica Huson
(74) *Attorney, Agent, or Firm* — Michael A. Ervin; M.A. Ervin & Associates

(57) ABSTRACT

This disclosure relates to a method and apparatus of preparing a molded article, and more particularly to a method and apparatus of automated molding using male molds and thermoplastic sheets in which the thermoplastic sheets are systematically draped across the mold contour.

10 Claims, 13 Drawing Sheets

METHOD AND APPARATUS FOR PREPARING A MOLDED ARTICLE

PRIORITY

This application claims the priority of U.S. provisional application 61/657,738 by the same inventor filed Jun. 9, 2012.

FIELD OF THE INVENTION

This disclosure relates to a method and apparatus of preparing a molded article, and more particularly to a method and apparatus of automated molding using male molds and thermoplastic sheets.

BACKGROUND OF THE INVENTION

Single sheet thermoforming processes typically involve providing a preformed sheet of thermoplastic material (usually on a roll), heating the preformed thermoplastic sheet to a thermoformable temperature, and contacting the heated thermoplastic sheet with a shaped mold surface. The heated thermoplastic sheet is typically drawn into contact with the shaped mold surface by means of a vacuum being drawn through perforations in the mold surface.

Such prior art methods of single sheet thermoforming typically and undesirably involve multiple steps, such as separately forming the thermoplastic sheet, collecting the preformed thermoplastic sheet on a roll, shipping the roll of preformed thermoplastic sheet to a molder (or fabricator), and re-heating the preformed thermoplastic sheet prior to the thermoforming operation. In addition, such prior art methods of single sheet thermoforming also typically do not provide sufficient control of the thermoplastic sheet thickness over contoured (e.g., recessed) mold surfaces. For example, the molded thermoplastic sheet may be too thin (e.g., in deep drawn areas), and/or too thick in other areas. Such variability in molded sheet thickness may result in the final molded article having undesirably variable physical properties, such as crack failure, and aesthetic properties, such as an uneven visual appearance (e.g., irregular color).

Thermoforming processes that involve the continuous extrusion of a thermoplastic sheet, that is thermoformed using residual heat from the extruded thermoplastic sheet are known. See, for example, U.S. Pat. Nos. 6,814,905 B1, 6,086,800 and 4,061,706. Such continuous thermoforming methods, while perhaps addressing or eliminating some of the multiple steps involved with the use of preformed thermoplastic sheets, typically and undesirably do not provide sufficient control of the thermoplastic sheet thickness over contoured (e.g., recessed) mold surfaces.

U.S. Pat. No. 7,842,225 addresses and solves some of those problems by the use of a mold apparatus that includes a sheet retainer around the edge of the mold that is moveable and accepts a heated thermoplastic sheet and controls the movement of that sheet to bring it into proper contact with the mold. The heated thermoplastic sheet then cools, and a shaped thermoplastic sheet retaining the contour of interior mold surface is formed.

For some applications, particularly for large parts and male molds it would be desirable to develop a simpler thermoforming processes and apparatus, that minimizes or eliminates some of the steps typically encountered with prior art methods.

SUMMARY OF THE INVENTION

This improvement can be found with a method for preparing a molded article including at least the steps of: providing a mold apparatus comprising, a mold portion having an exterior mold surface, and a perimeter edge, the exterior mold surface having a contour and a plurality of perforations; and at least one table structure having an upper surface, the table structure having a longitudinal axis that is oriented along at least a portion of the perimeter edge, the table structure being reversibly and controllably positionable along at least one of an x-axis, a y-axis and a z-axis relative to the perimeter edge; positioning the table structure such that the upper surface of the table structure is located above the perimeter edge and on a plane equivalent to the top exterior mold surface of the mold portion; forming, from at least one thermoplastic composition, a heated thermoplastic sheet having a temperature that allows the heated thermoplastic sheet to be thermoformable; contacting a first portion of the heated thermoplastic sheet with at least a portion of the upper exterior mold surface of the mold portion and the at least one table structure; moving the mold apparatus relative to the thermoplastic sheet to allow deployment of the thermoplastic sheet across the plane formed by the top exterior mold surface of the mold portion and the table structures; moving each table structure independently down along the z-axis and away from the center of the mold portion in either the x-axis or y-axis direction, allowing the table structures to slide from underneath the thermoplastic sheet so that the thermoplastic sheet steadily drapes down and across the exterior mold surface, substantially matching the contour of the exterior mold surface; drawing reduced pressure through the plurality of perforations of the exterior mold surface of the mold portion, such that the heated thermoplastic sheet substantially matches the contour of the exterior mold surface of the exterior mold portion; cooling the heated thermoplastic sheet thereby forming a shaped thermoplastic sheet that retains the contour of the exterior mold surface of the mold portion; and removing the shaped thermoplastic sheet from the first mold portion, wherein the shaped thermoplastic sheet is the molded article.

The improvement can also be achieved with a sheet molding apparatus including at least: a mold portion having an exterior mold surface, and a perimeter edge, the exterior mold surface having a contour and a plurality of perforations; and a vacuum apparatus that is in fluid communication with the mold portion, the vacuum apparatus controllably drawing reduced pressure through the plurality of perforations of the exterior mold surface of the mold portion; at least one table structure having an upper surface, the table structure having a longitudinal axis that is oriented along at least a portion of the perimeter edge, the table structure being reversibly and controllably positionable along at least one of an x-axis, a y-axis and a z-axis relative to the perimeter edge.

BRIEF DESCRIPTION OF THE DRAWINGS

In FIGS. 1 through 13, like reference numerals designate the same components and structural features, unless otherwise indicated.

DETAILED DESCRIPTION OF THE INVENTION

Figure 1:
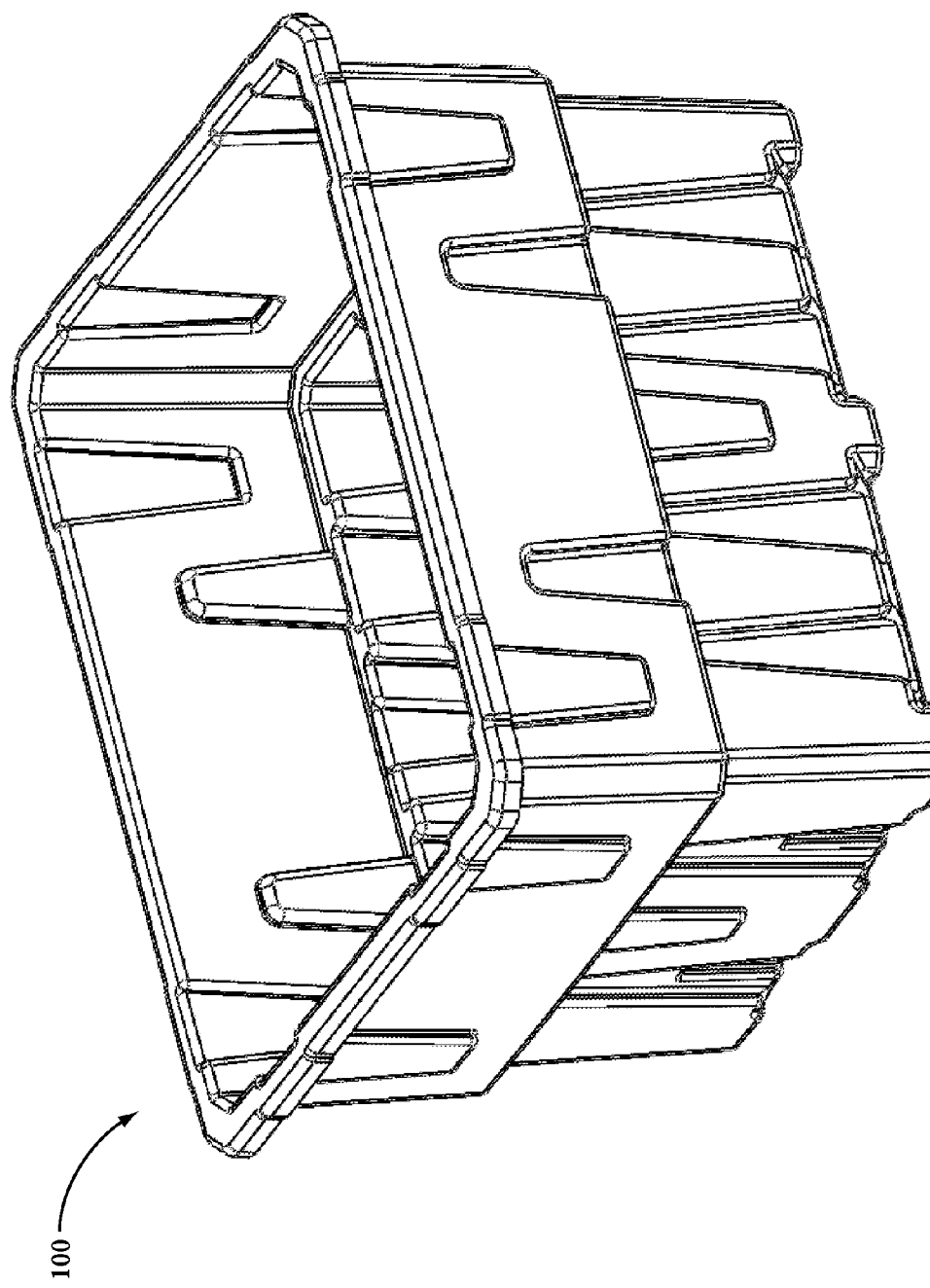
FIG. 1 is a representative perspective view of a product that might be produced by the method of this disclosure.
Figure 2:
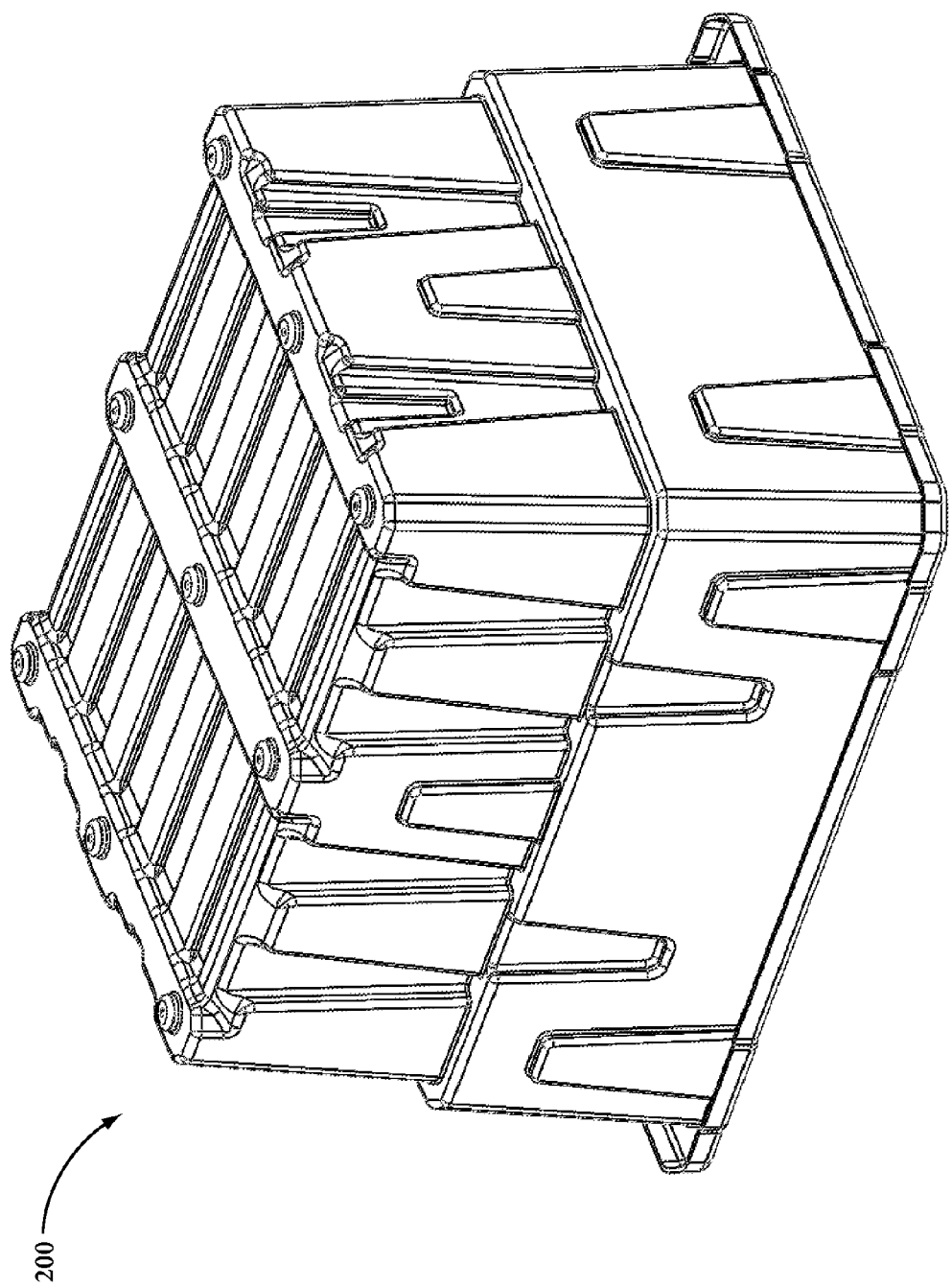
FIG. 2 is second representative perspective view of a product that might be produced by the method of this disclosure.

Referring first to FIGS. 1 and 2, a representative article is shown that will be used as an example to illustrate the process and apparatus of this description. The apparatus and method to be described is of course not limited to this article.

In FIG. 1, shown by the numeral 100, is a container that might be used as a commercial refuse and recycling container. These are often produced from thermoplastic or composite plastic materials and may have a steel frame and wheels around the base in use. For extensive commercial use the body of such a device should be molded from a strong, durable molded plastic construction.

In FIG. 2, shown by the numeral 200, is the same container viewed from below. The automated molding of such a container, which may be more than 1 meter deep, can be difficult with a typical female mold. In this disclosure we present a novel and automatic process and apparatus to rapidly mold articles using a male mold and a unique automated draping process for applying a thermoplastic sheet to the mold.

Figure 3:
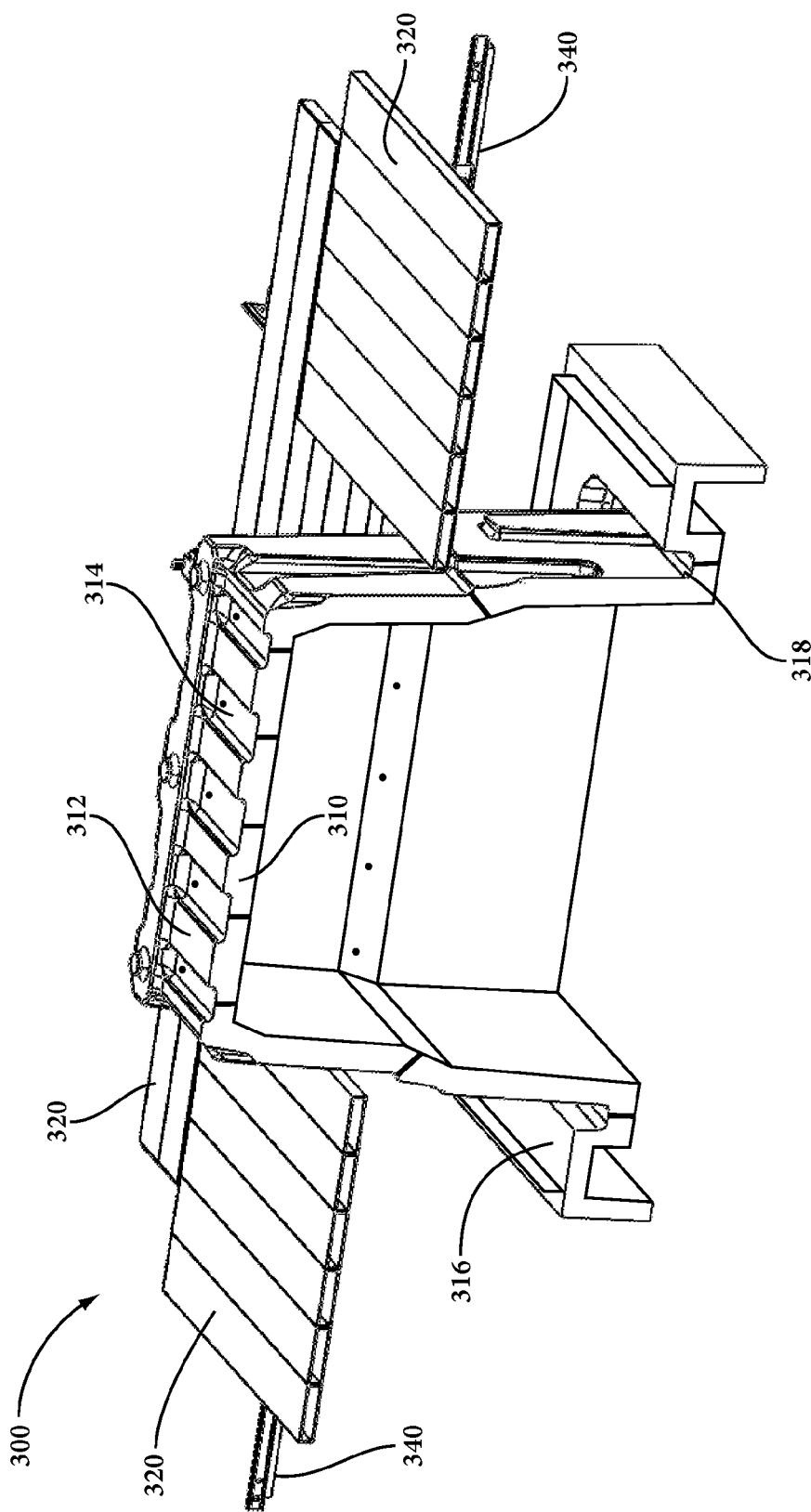
FIG. 3 is a representative cross-section view of the sheet molding apparatus of this disclosure.

Turning to FIG. 3, shown as a cross section for clarity, demonstrates some of the elements of a sheet molding apparatus 300 of the present disclosure. The apparatus includes a mold portion 310 that would typically be described as a male mold. The mold surface has a top exterior mold surface representative of the bottom of the article to be molded of FIGS. 1 and 2. The top exterior mold surface of mold portion 310 may have raised portions 312 and/or recessed portions 314. Mold portion 310 has a perimeter edge 316 and a recessed valley 318 to allow the thermoplastic material to mold completely to the extent of mold portion 310. Perimeter edge 316 typically defines the terminal extent of mold portion 310 beyond which heated thermoplastic sheet, if any, extending there-beyond does not form a portion of the final molded article. Typically, thermoplastic sheet, if any, extending beyond perimeter edge 316 is removed (e.g., cut away) from the final molded article. Perimeter edge 316 may have any suitable shape, such as rounded, polygonal, irregular or combinations thereof.

Positioned around mold portion 310 are a series of flat table structures 320 with underling control mechanisms adapted to move table structures 320 in the "x", "y", and z" directions as needed. As will be shown in subsequent drawings the manufacturing method begins with table structures 320 positioned on a plane equivalent to the top exterior mold surface of mold portion 310 allowing the thermoplastic molding sheet to lay flat across the top exterior mold surface of mold portion 310.

Figure 4:
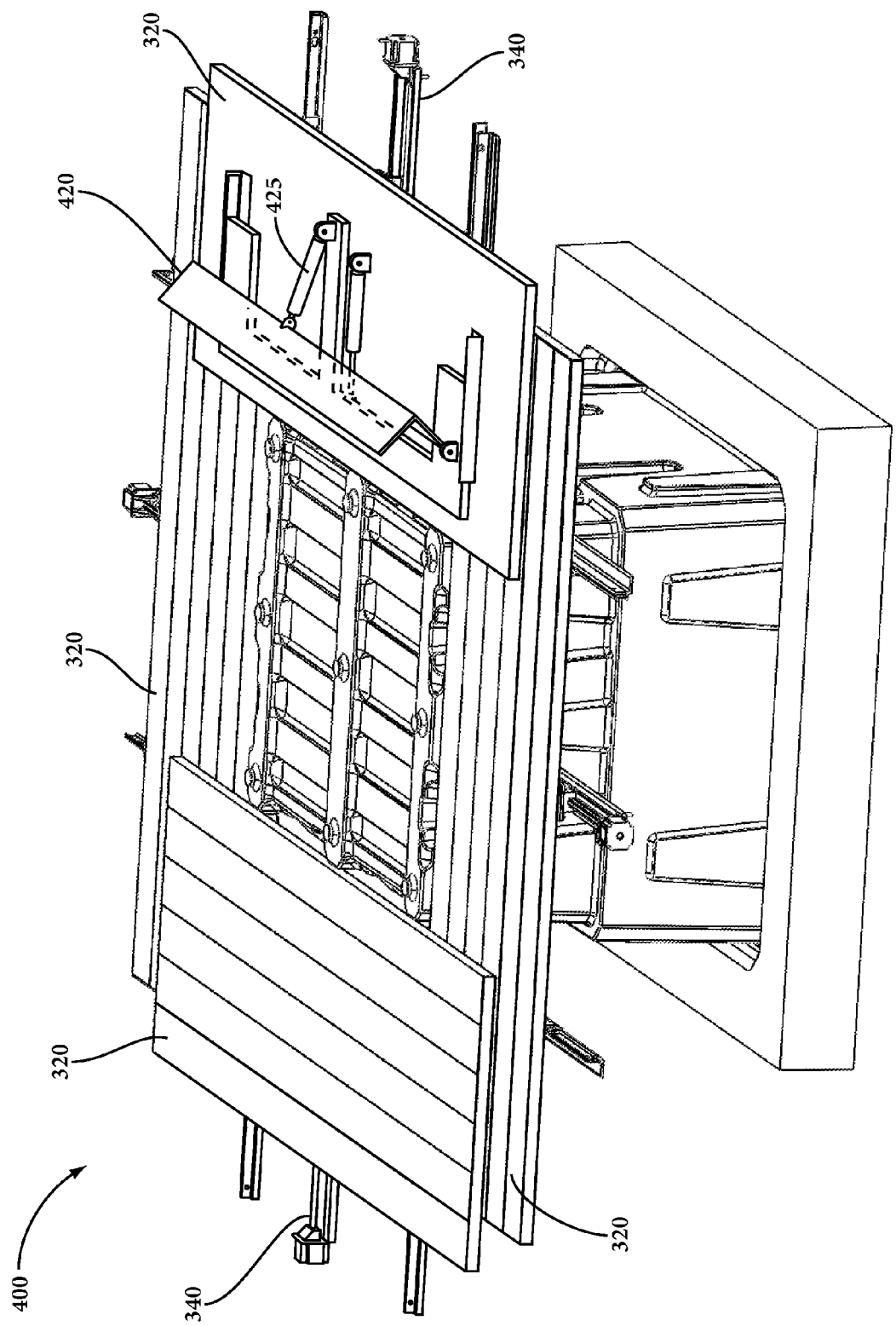
FIG. 4 is a representative perspective view of an alternate embodiment of the apparatus of this disclosure.
Figure 5:
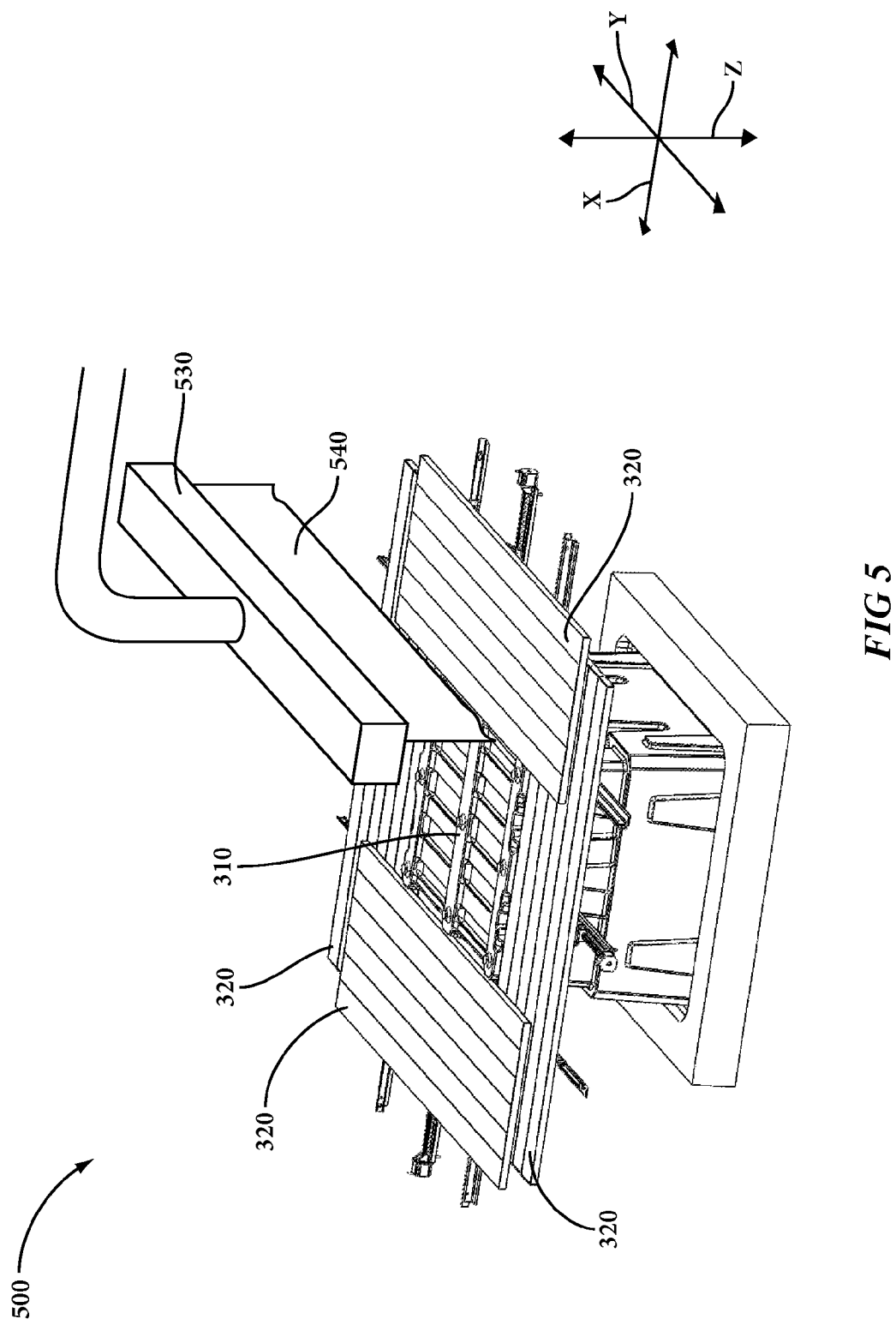
FIG. 5 is a representative perspective view of the mold apparatus of the present disclosure at the beginning of the manufacturing process.

This is illustrated in FIG. 4, along with a further embodiment of the disclosure. The complete mold apparatus, represented by the numeral 400, is shown with the table structures 320 positioned at the top exterior mold surface of mold portion 310. Underlying control mechanisms 340 are programmed to automatically move table structures 320 from these initial positions to gradually drop in the "z" direction and/or to gradually move away from the "x" and "y" directions mold portion 310 as the molding proceeds. The "x", "y", and "z" orientations are indicated in FIG. 5.

Clamp 420, with mechanical drivers 425, is an embodiment used for some mold shapes to clamp down and hold the thermoplastic sheet during the molding process.

The full manufacturing process will now be shown in FIGS. 5 through 13.

The sheet molding apparatus of the present invention may further include an extruder (not shown) and a sheet die 530. The extruder may be selected from single screw, or counter- or co-rotating twin screw extruders that are known to the skilled artisan and typically includes one or more heated zones along the length of its barrel, the temperature(s) of which is controllable. A thermoplastic composition, typically comprising at least one thermoplastic polymer and optionally one or more additives (e.g., glass fibers and/or antioxidants), is introduced into the extruder, is melted and compounded as it moves through the barrel, and is fed into sheet die 530.

Sheet die 530 may be a dynamic sheet die having a plurality of gates that may be controllably and reversibly moved by separate actuators (not shown) across the slot of sheet die 530 so as to control the amount of molten thermoplastic material passing through, and accordingly the thickness, width and shape of the heated thermoplastic sheet produced.

Rather than a slot, sheet die 530 may have a plurality of laterally aligned openings (not shown) through which the molten thermoplastic material emerges. The openings are positioned such that molten thermoplastic material emerging from one opening merges and becomes continuous with the molten thermoplastic material emerging from its adjacent/neighboring opening(s), thereby forming the heated thermoplastic sheet 540. The plurality of laterally aligned openings in effect acting as a slot with regard to formation of the heated thermoplastic sheet.

Sheet die 530, and mold assembly 300 may be positioned relative to each other in any suitable way, provided that heated thermoplastic sheet 540 emerging from sheet die 530 may be contacted to drape uniformly across table structures 320 and the top exterior mold surface of mold portion 310. For example, sheet die 530 may be positioned so as to produce a heated thermoplastic sheet 540 that drops gravitationally downward (as depicted), and mold portion 310 and the table structures 320 may together be positioned vertically (not depicted) so as to be parallel with the plane of the gravitationally dropping heated thermoplastic sheet.

Figure 6:
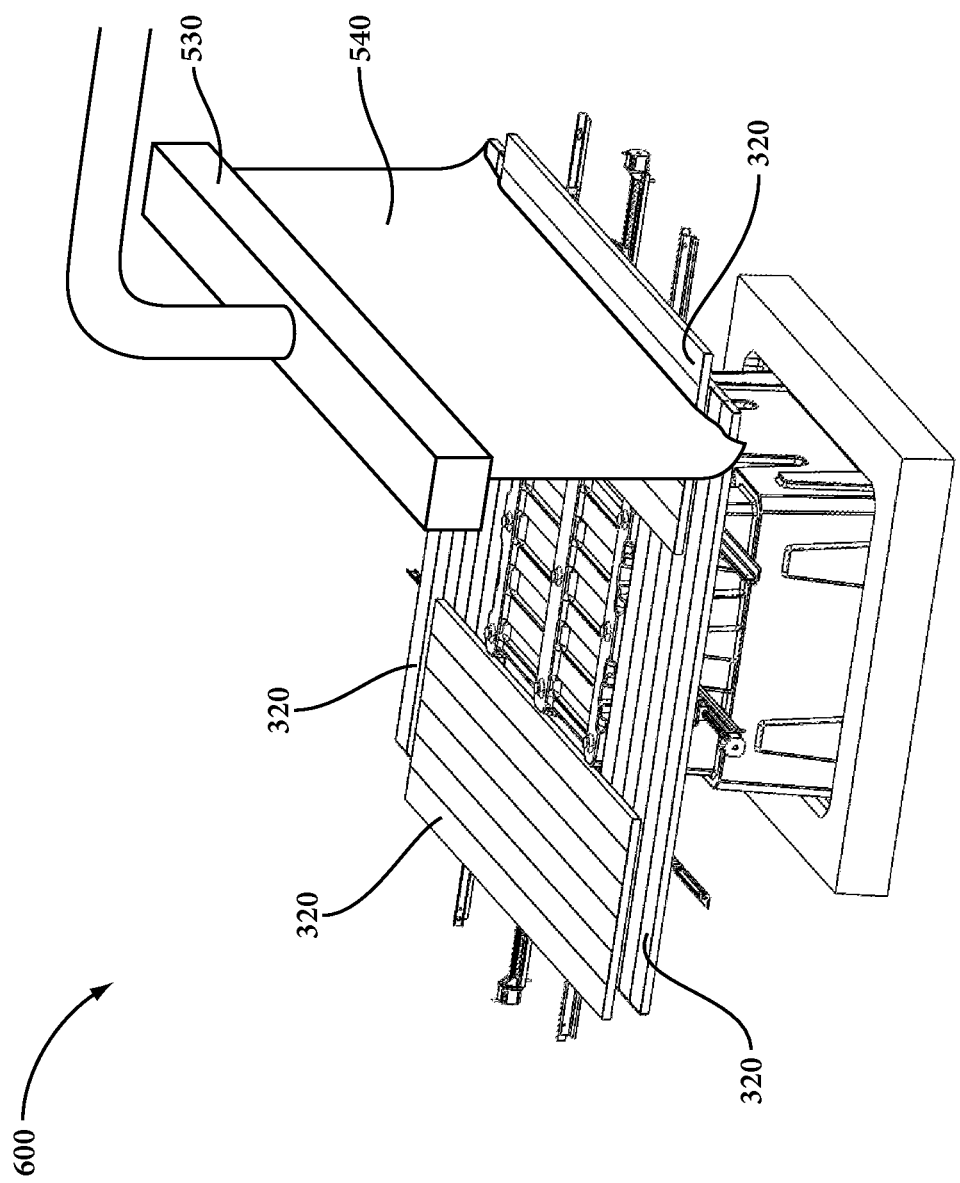
FIG. 6 is a representative perspective view of the mold apparatus of the present disclosure further into the manufacturing process.

In FIG. 6, represented by the numeral 600, demonstrates the initial contact of thermoplastic sheet 540 as the manufacturing proceeds. The relative movement between thermoplastic sheet 540 and the underlying mold assembly can be accomplished with either a static sheet die 530 and a moving mold assembly underneath or vice versa, with a static mold assembly and moving sheet die.

Figure 7:
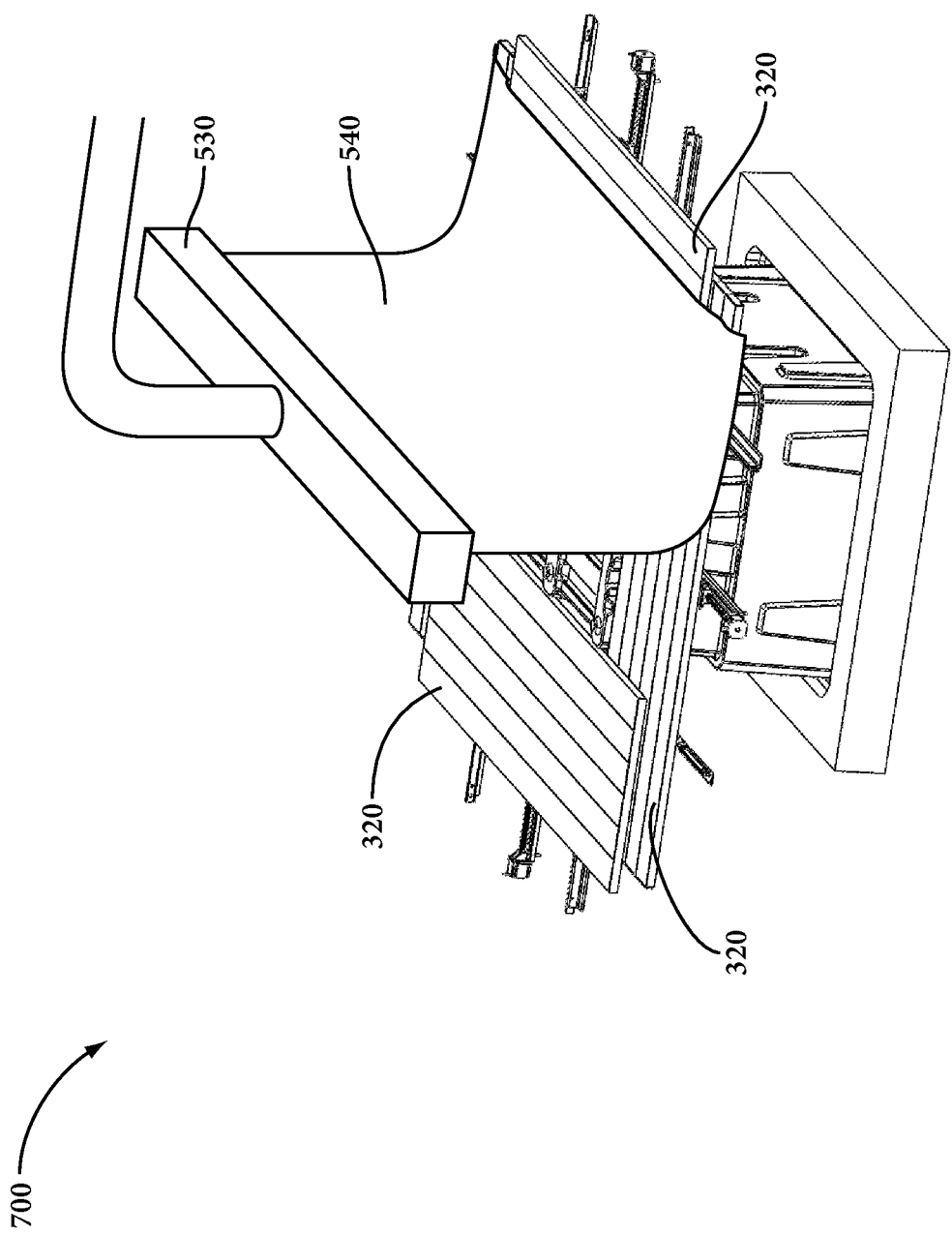
FIG. 7 is a representative perspective view of the mold apparatus of the present disclosure further into the manufacturing process.

In FIG. 7, represented by the numeral 700, the manufacturing process proceeds as the sheet die 530 continues to deploy a growing thermoplastic sheet 540 that is evenly deposited across table structures 320 and the top surface of mold portion 310.

Figure 8:
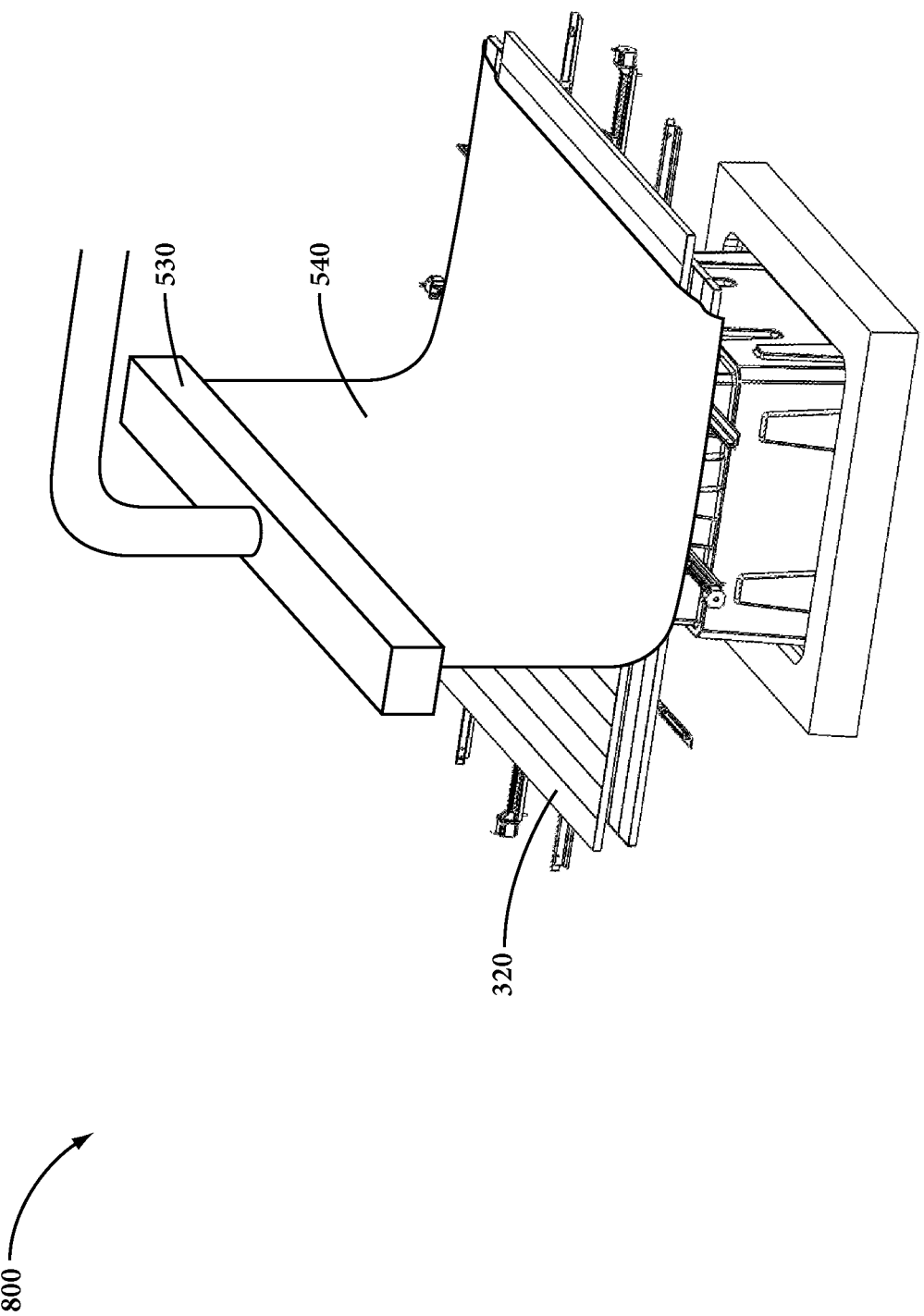
FIG. 8 is a representative perspective view of the mold apparatus of the present disclosure further into the manufacturing process.

In FIG. 8, represented by the numeral 800, the manufacturing process proceeds as the sheet die 530 continues to deploy a growing thermoplastic sheet 540 that is evenly deposited across table structures 320 and the top surface of mold portion 310.

Figure 9:
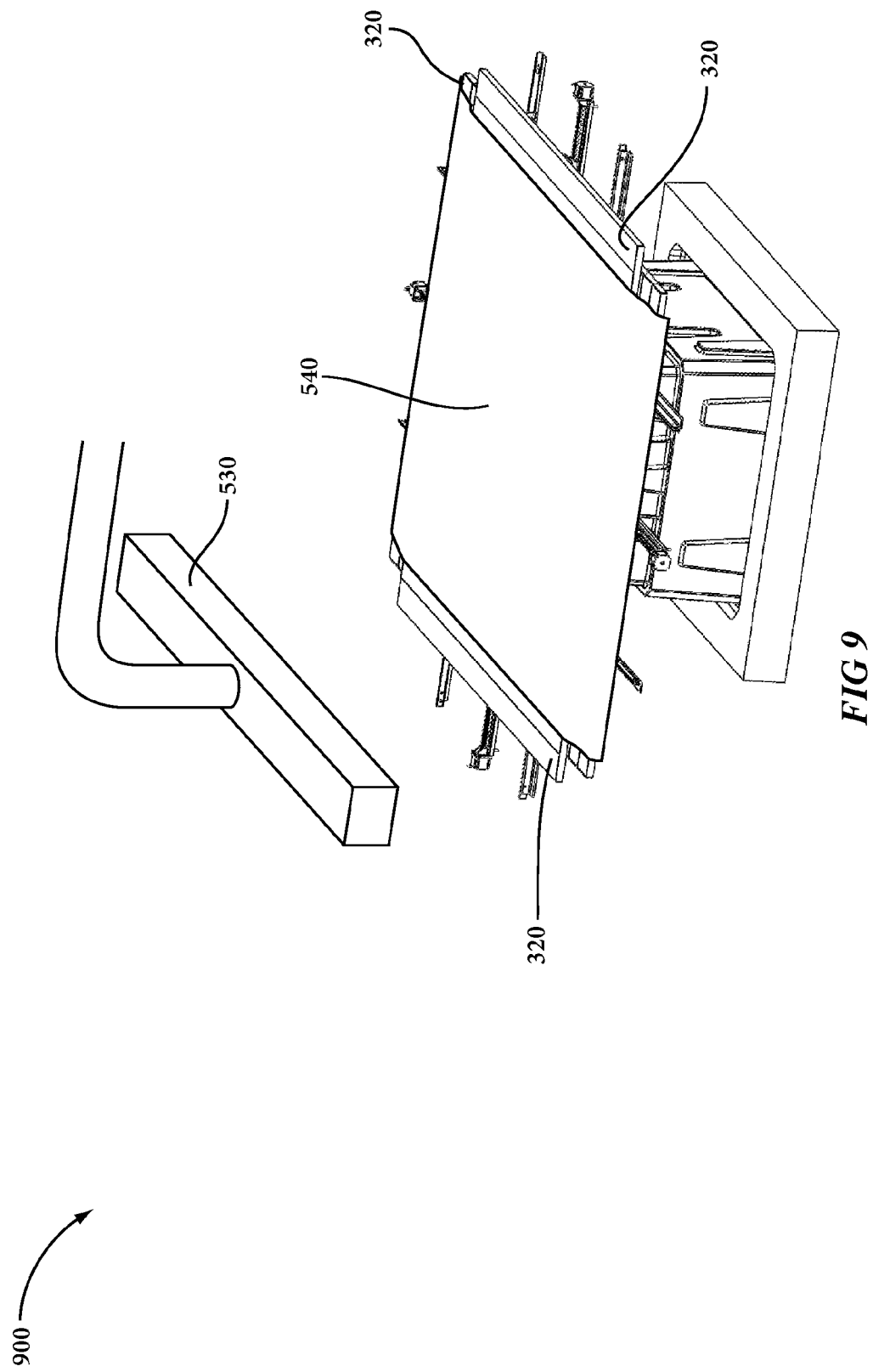
FIG. 9 is a representative perspective view of the mold apparatus of the present disclosure after the thermoplastic sheet has been deployed.

In FIG. 9, represented by the numeral 900, the first lay-down phase of the manufacturing process is completed when the full sheet 540 is deposited flat across the table structures 320 and the top surface of mold portion 310. The proper amount of thermoplastic sheet and the precise cutting of the sheet at the end of its extrusion are programmed into the extruder/die system using art-recognized methods.

Figure 10:
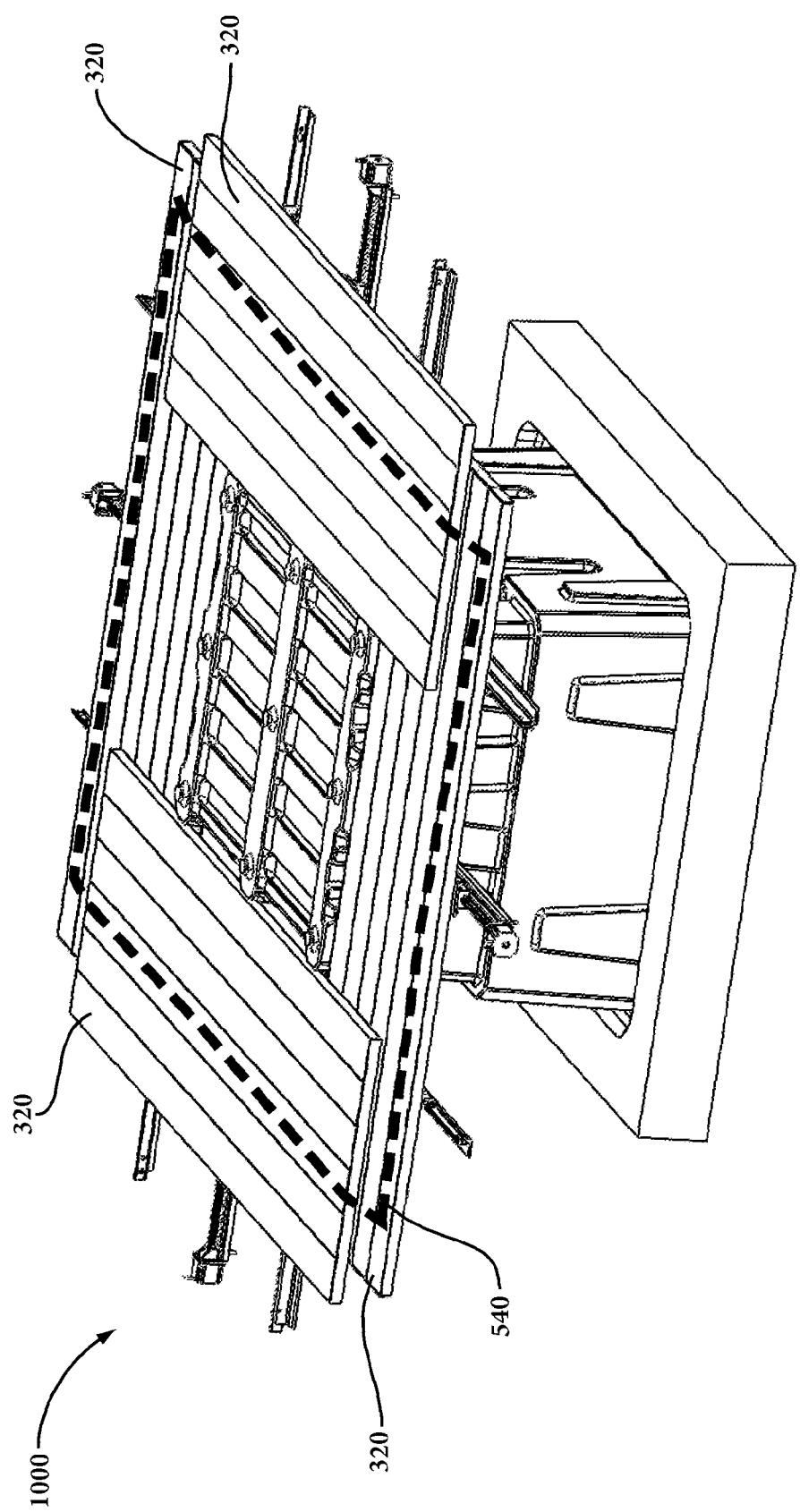
FIG. 10 is a alternate representative perspective view of the mold apparatus of the present disclosure after the thermoplastic sheet has been deployed.

In an alternate rendition FIG. 10, represented by the numeral 1000, exhibits a transparent thermoplastic sheet 540, to show the configuration at this point of the process. Thermoplastic sheet 540 at this point of the process is still hot and molten.

An important aspect of this process is for the hot thermoplastic sheet 540 to easily slide across the table structures 320. It has been found that this can be accomplished by several art recognized methods including applying a fine dusting of a powder such as a talcum power on the table structures. Alternately permanent surface treatments such as Teflon coatings on the table surfaces will also suffice.

Figure 11:
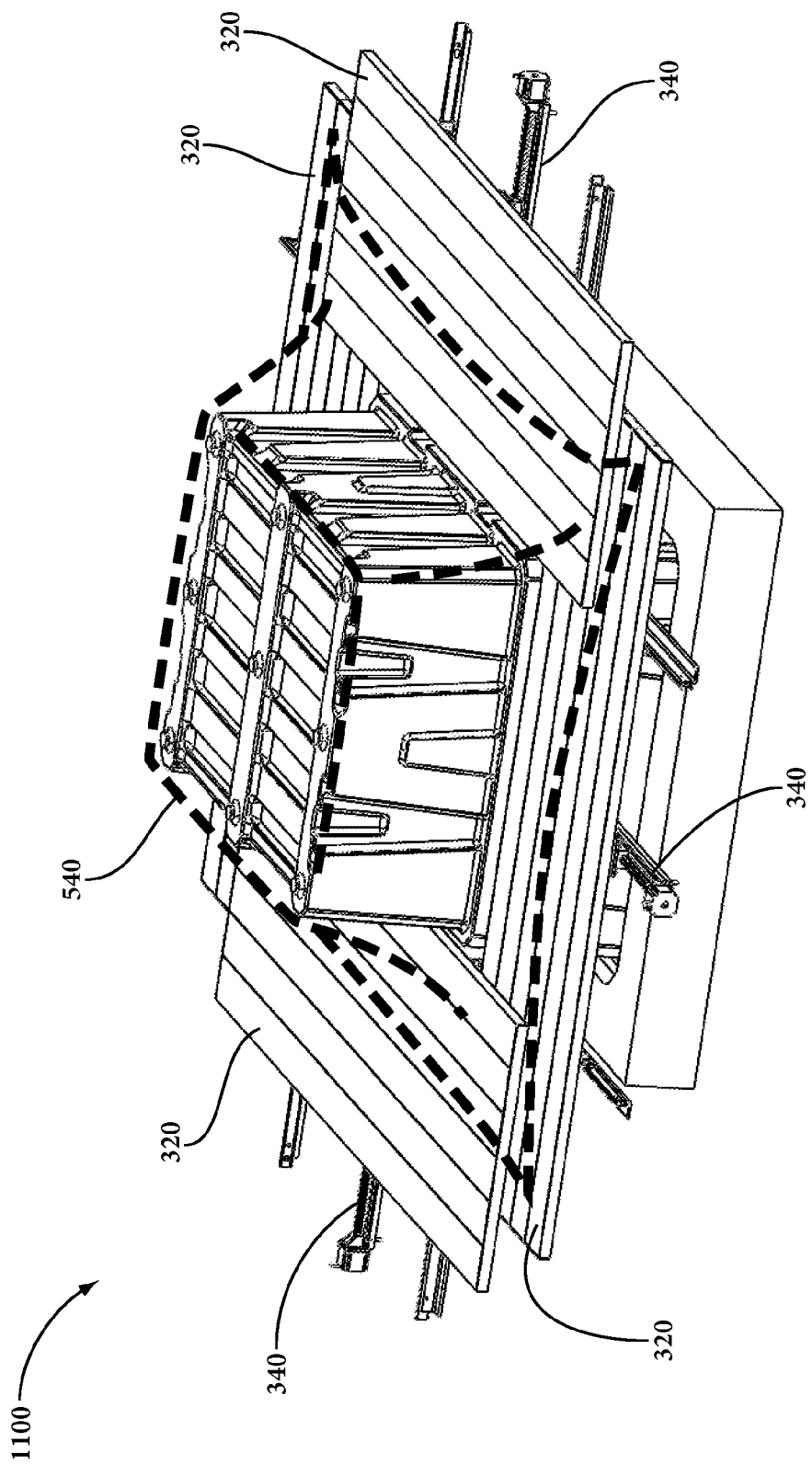
FIG. 11 is a representative perspective view of the mold apparatus of the present disclosure as the draping process begins.

The next automatic phase of the manufacturing process occurs at this point and is shown beginning in FIG. 11, shown by the numeral 1100. The four table structures 320 operate independently under the control of the underlying control mechanisms 340. These are pre-programmed to slowly lower in "z" elevation while simultaneously move outward in the "x" and "y" directions from the center of the mold system so as to gradually slide out from underneath thermoplastic sheet 540. Under the influence of gravity thermoplastic sheet 540 gradually begins to drape across the mold structure 310. Again the thermoplastic sheet is still hot and molten and the table structures are "slippery" allowing gravity to do it's work.

Figure 12:
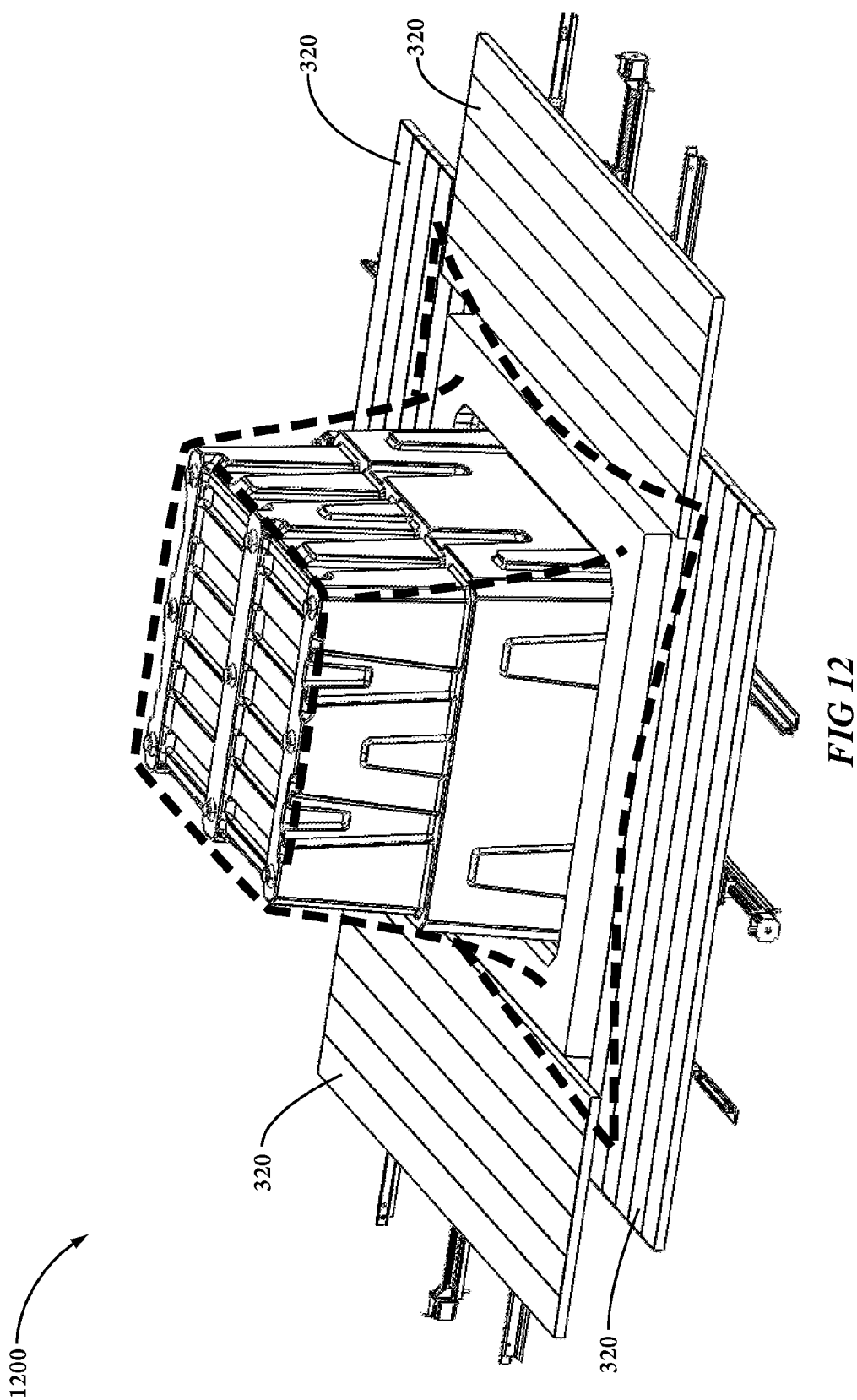
FIG. 12 is a representative perspective view of the mold apparatus of the present disclosure as the draping process continues.

In FIG. 12 the process is almost complete with table structures 320 moved down and away. This allows the thermoplastic sheet (shown as transparent) to drape completely around mold structure.

Figure 13:
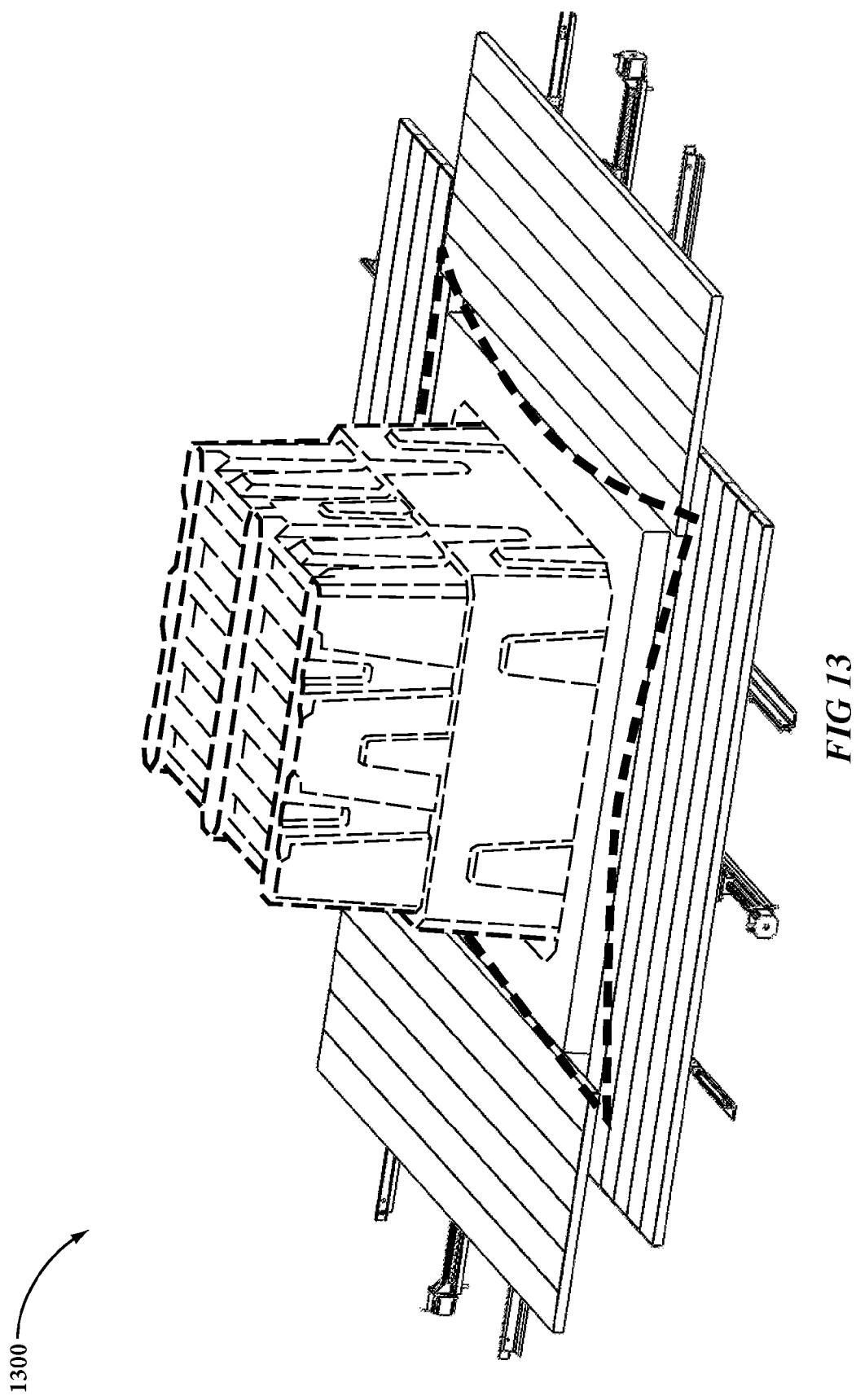
FIG. 13 is a representative perspective view of the mold apparatus of the present disclosure after the vacuum completion step.

In a final step, shown in FIG. 13, shown by the numeral 1300, a vacuum is applied internally to mold portion 310, to pull the draped thermoplastic sheet tightly onto mold portion 310. Typically mold portion 310 will have a plurality of perforations (not shown) in communication with the interior of mold portion 310. The reduced pressure drawn through the perforations may be ramped in stages with at least one pressure plateau, or the reduced pressure may be drawn at the full capacity of the vacuum apparatus from the instant it is turned on.

To assist removing the molded article from mold portion 310, a gas (e.g., air) may be passed out of the perforations at elevated pressure (i.e., at a pressure greater than ambient atmospheric pressure). To pass a gas, such as air, at elevated pressure out through the perforations, the vacuum apparatus may be operated in reverse, and/or a separate pressure pump (not shown) may be used in fluid communication with the internal chamber and thus the perforations of mold portion 310. In addition, the gas passed out of the perforations may be cooled to a temperature less than ambient temperature to further assist cooling the heated thermoplastic sheet, such that it retains the contour shape of the mold surface.

The sheet die 530 may be fed by an extruder (not shown). The extruder may be selected from single screw, or counter- or co-rotating twin screw extruders that are known to the skilled artisan. Extruder may includes one or more heated zones along the length of its barrel, the temperature(s) of which is controllable. A thermoplastic composition, typically comprising at least one thermoplastic polymer and optionally one or more additives (e.g., glass fibers and/or antioxidants), is introduced into a feed port and melted and compounded as it moves through the barrel, and emerges from the terminal end as a molten thermoplastic composition.

The terminal end of extruder the is in fluid communication with sheet die 530. The molten thermoplastic composition is forwarded from the terminal end of the extruder into sheet die 530.

Sheet die 530 may be a dynamic sheet die having a plurality of gates that may be controllably and reversibly moved, by separate actuators across the slot of sheet die 530 so as to control the amount of molten thermoplastic material passing through, and accordingly the thickness, width and shape of the heated thermoplastic sheet emerging. The gates may be operated so as to produce a heated thermoplastic sheet having openings that are free of thermoplastic material. For example, as heated thermoplastic sheet 540 is formed, some of the gates 104 forming interior portions of the sheet, may be closed for a predetermined amount of time and then reopened, thereby resulting in openings or slots being formed in the sheet.

Rather than a slot, sheet die 530 may have a plurality of laterally aligned openings through which the molten thermoplastic material emerges. The openings are positioned such that molten thermoplastic material emerging from one opening merges and becomes continuous with the molten thermoplastic material emerging from its adjacent/neighboring opening(s), thereby forming the heated thermoplastic sheet. The plurality of laterally aligned openings in effect acting as a slot with regard to formation of the heated thermoplastic sheet. Each opening may have a reversibly and controllably associated closeable gate.

Sheet die 530, and the mold portion 310 and table structures 320 may be positioned relative to each other in any suitable way, provided that the heated thermoplastic sheet 540 emerging from sheet die 530 may be deployed (draped) over mold portion 310 and table structures 320.

In an embodiment, (the embodiment of FIG. 4), the mold portion 310 and table structures 320 are together positioned in a plane beneath sheet die 530. As the heated thermoplastic sheet 540 is formed and drops vertically and gravitationally from sheet die 530 the first portion of thermoplastic sheet is deposited slightly inside clamp 420 and the clamp mechanism 425 moves clamp 420 down to pin the sheet against table 320. In this embodiment clamp 420 serves to hold the sheet immobile during the deployment of sheet 540 across the top of the mold portion 310 and table structures 320. Once the complete sheet is deployed the clamp is lifted to allow the sheet to slide over table structures 320 as they move down and away from the center of mold portion 310.

Once the clamp is lifted the process shown in FIGS. 5 through 13 for completing the draping and molding proceeds as described earlier.

In an embodiment of this disclosure, mold portion 310 and each table structure 320 are together positioned and are reversibly moveable in a plane beneath sheet die 530, and sheet die 530 is substantially stationary.

To achieve reversible movement of mold portion 310 and the table structures 320 in concert in the plane beneath sheet die 530, mold portion 310 and each table structure 320 together reside on a platform (not shown). Typically, mold portion 310 and table structures 320 are fixedly attached to the platform (e.g., by fasteners, such as bolts—not shown).

The platform may be reversibly moveable in the plane beneath sheet die 530 by known locomotion means, such as skids, tracks, wheels alone, wheels in conjunction with rails, and combinations thereof. The platform may further include a vertically positionable plate (not shown) on which mold portion 310 and table structures 320 may together reside. The vertically positionable plate is reversibly positionable along the z-axis, thereby moving mold portion 310 and table structures 320 together along the z-axis (e.g., vertically). Vertical movement of mold portion 310 and table structures 320 may be undertaken for reasons including, but not limited to, positioning mold portion 310 and table structures 320 closer to or further from sheet die 530, and more particularly closer to/further from the slot of sheet die 530 from which the heated thermoplastic sheet 540 emerges.

In the method of the present disclosure, each table structure 320 is initially positioned such that the upper surface is located approximately at the upper exterior mold surface of mold portion 310. See FIG. 5. As described previously, the table structures are reversibly and controllably positionable along the x-, y- and z-axes.

A heated thermoplastic sheet (e.g., 540) is formed from at least one thermoplastic composition. The heated thermoplastic sheet has a temperature that allows it to be thermoformable in particular, when: (i) contacted and retained on the upper surface of each table structure 320; and (ii) contacted and drawn into intimate contoured contact with the mold surface of mold portion 310. While the temperature of the heated thermoplastic sheet may be equal to or greater than the melting point of the thermoplastic sheet, the temperature of the heated thermoplastic sheet is more typically within a range that is equal to or greater than the softening point (or glass transition temperature) of the thermoplastic sheet, and less than or equal to the melting point of the thermoplastic sheet (i.e., and equivalently, the softening point/Tg and melting point, respectively, of the thermoplastic composition from which the thermoplastic sheet is formed).

The temperature of the heated thermoplastic sheet may be determined by art-recognized methods, such as contacting thermocouples with the first and second surfaces of the heated thermoplastic sheet, and inserting a thermocouple into the interior portion of the heated thermoplastic sheet. Alternatively, or in addition thereto, remote temperature sensors, such as an infrared sensor, may be used to determine the temperature of the first and second surfaces of the heated thermoplastic sheet.

The heated thermoplastic sheet may be formed by known methods that involve melting a thermoplastic composition so as to form a molten thermoplastic composition, and then forming a heated thermoplastic sheet from the molten thermoplastic composition. In an embodiment, and as described previously herein, the thermoplastic composition is melted in an extruder (e.g., a single screw, or co- or counter-rotating twin screw extruder). The terminal end of the extruder is in fluid communication with sheet die 530. A molten thermoplastic composition is formed within the extruder and forwarded to and passed through sheet die 530, so as to form the heated thermoplastic sheet (e.g., 540). The heated thermoplastic sheet typically emerges from a slot in the sheet die, and drops vertically and gravitationally. The sheet die may be selected and operated in accordance with the description provided previously.

After the application of vacuum at the end of the manufacturing cycle and while maintained in intimate contour matching contact with the exterior mold surface, the heated thermoplastic sheet is cooled. Cooling of the heated thermoplastic sheet results in the formation of a shaped thermoplastic sheet that retains the contour of the mold surface of mold portion 310. The heated thermoplastic sheet is typically cooled to a temperature that is less than the softening point or glass transition temperature of the thermoplastic sheet. When cooled to a temperature below its softening point or glass transition temperature, the thermoplastic sheet is no longer thermoformable, and as such retains the contoured shape of the mold surface.

Cooling of the heated and molded/shaped thermoplastic sheet may be achieved by known means. For example, cool air may be passed over the first surface of the heated thermoplastic sheet, and/or the interior mold surface of the mold portion may be cooled (e.g., by means of a chilled fluid or coolant being passed through conduits located under the interior mold surface of the mold portion—not shown). Alternatively, or in addition to such cooling methods, a chilled liquid, such as water (e.g., having a temperature of greater than 0° C. and less than or equal to 25° C.) may be contacted directly (e.g., by misting/atomizing) with at least a portion of the first surface of the heated and molded/shaped thermoplastic sheet.

After the thermoplastic sheet has been sufficiently cooled, the resulting shaped thermoplastic sheet (or molded article) is removed from the mold portion. Removal of the shaped thermoplastic sheet from the mold portion may be achieved by art-recognized methods. For example, one or more ejector cores may extend reversibly outward from the interior mold surface, in effect pushing the shaped thermoplastic sheet off of and away from the mold portion. Alternatively, or in addition thereto, a gas (e.g., air) may be passed under pressure through the plurality of perforations (e.g., 26) in the interior mold surface, thereby lifting the shaped thermoplastic sheet off of and away from the mold portion.

The excess portion of the thermoplastic sheet extending from the perimeter edge of the mold portion is typically detached along the perimeter edge after the heated thermoplastic sheet has been drawn by reduced pressure into intimate contour matching contact with the exterior mold surface of the mold portion. The excess thermoplastic sheet material may be detached prior to or after the shaped thermoplastic sheet is removed from the mold portion. Typically, the excess thermoplastic sheet material is detached prior to removal of the shaped thermoplastic sheet from the mold portion.

The excess thermoplastic sheet material may optionally be detached after the shaped thermoplastic sheet is removed from the mold portion. The excess thermoplastic sheet material may, for example, be used to secure and transport the shaped thermoplastic sheet during post-molding operations, such as sanding, applying labels, cutting holes, inserting attachments and/or painting. After completion of the post molding operations, the excess thermoplastic sheet material may then be detached from the shaped thermoplastic sheet.

As discussed previously with regard to the sheet molding apparatus, in an embodiment of the method of the present invention, the mold portion 310 and table structures 320 are together positioned and moveable in a plane (e.g., the plane defined by the x- and y-axes of FIG. 5) beneath the sheet die, and the sheet die is substantially stationary. The mold portion 310 and table structures 320 may both reside on a platform (not shown) that is moveable within the plane beneath sheet die 530, in accordance with the description previously provided herein. In this embodiment, the method further includes moving the mold portion 310 and table structures 320 together in the plane beneath the sheet die as the thermoplastic sheet is formed, thereby facilitating contact between the heated thermoplastic sheet and the upper surface of each table structure 320 and the top mold surface of mold portion 310. As the mold portion 310 and table structures 320 are moved beneath the sheet die 530, the heated thermoplastic sheet is in effect draped across them. See, for example, FIGS. 6 through 9. The linear speed at which the mold portion 310 and table structures 320 are moved beneath sheet die 530, and the rate at which heated thermoplastic sheet 540 is produced from sheet die 530, may together be controlled so as to control the thickness of the heated thermoplastic sheet 540 as it is draped across the mold portion 310 and table structures 320. The rate of linear movement and rate of heated thermoplastic sheet formation may each be variably and independently controlled so as to vary the thickness of the heated thermoplastic sheet across the mold portion 310 and table structures 320.

In the method of the present invention, the heated thermoplastic sheet is formed (e.g., by melt compounding/extrusion) from at least one thermoplastic composition. The thermoplastic composition includes at least one thermoplastic material. As used herein and in the claims, the term "thermoplastic material" and similar terms, means a plastic material that has a softening and melting point, and is substantially free of a three dimensional crosslinked network resulting from the formation of covalent bonds between chemically reactive groups, e.g., active hydrogen groups and free isocyanate groups. Examples of thermoplastic materials that may be included in the thermoplastic composition include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-styrene-acrylate and combinations thereof (e.g., blends and/or alloys of at least two thereof).

In an embodiment of the present invention, the thermoplastic material of each thermoplastic composition is independently selected in each case from thermoplastic polyolefins. As used herein and in the claims, the term "polyolefin" and similar terms, such as "polyalkylene" and "thermoplastic polyolefin," means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefin, such as 1-butene, 1-hexene and/or 1-octene.

The polyolefins, from which the thermoplastic material of each thermoplastic composition, may in each case be independently selected include, but are not limited to, heterogeneous polyolefins, homogeneous polyolefins, and combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The thermoplastic material of each thermoplastic composition may independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the thermoplastic material. The reinforcing fibers, and the glass fibers in particular, may have sizings on their surfaces to improve miscibility and/or adhesion to the thermoplastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The thermoplastic sheet may include fibers having lengths that are at least 50 or 85 percent of the lengths of the fibers that are present in the feed materials from which the thermoplastic sheet is prepared, such as from 0.25 inches to 2 or 4 inches (0.64 cm to 5.08 or 10.16 cm). The average length of fibers present in the thermoplastic sheet may be determined in accordance with art recognized methods. For example, the thermoplastic sheet may be pyrolyzed to remove the thermoplastic material, and the remaining or residual fibers microscopically analyzed to determine their average lengths, as is known to the skilled artisan.

Fibers are typically present in the thermoplastic composition, and accordingly the thermoplastic sheet, in amounts selected independently from 5 to 70 percent by weight, 10 to 60 percent by weight, or 30 to 50 percent by weight (e.g., 40 percent by weight), based on the total weight of the thermoplastic sheet (i.e., the weight of the thermoplastic material, the fiber and any additives). Accordingly, the shaped thermoplastic sheet prepared by the method of the present invention may include fibers in amounts of from 5 to 70 percent by weight, 10 to 60 percent by weight, or 30 to 50 percent by weight (e.g., 40 percent by weight), based on the total weight of the thermoplastic sheet.

The fibers may have a wide range of diameters. Typically, the fibers have diameters of from 1 to 20 micrometers, or more typically from 1 to 9 micrometers. Generally each fiber comprises a bundle of individual filaments (or monofilaments). Typically, each fiber is composed of a bundle of 10,000 to 20,000 individual filaments.

In addition or alternatively to reinforcing material(s), the thermoplastic composition(s), from which the heated thermoplastic sheet is prepared, may optionally include one or more additives. Additives that may be present in the thermoplastic composition include, but are not limited to, antioxidants, colorants, e.g., pigments and/or dyes, mold release agents, fillers, e.g., calcium carbonate, ultraviolet light absorbers, fire retardants and mixtures thereof. Additives may be present in the thermoplastic composition in functionally sufficient amounts, e.g., in amounts independently from 0.1 percent by weight to 10 percent by weight, based on the total weight of the thermoplastic composition.

In another embodiment of this disclosure the manufacturing process may not require an integrated extruder and sheet die. Pre-prepared and pre-cut thermoplastic sheets could be available and preheated in an oven, then manually placed across the table structures and mold portion into the configuration with the each table structure 320 initially positioned such that the upper surface is located approximately at the upper surface of mold portion 310, as shown in FIG. 5. Once the thermoplastic sheet is manually placed on the top surface the process is as shown in FIG. 9, ready to proceed through the draping process of FIGS. 10 through 13.

The present invention has been described with reference to specific details of particular embodiments. It is not intended that such detailed be regarded as limitations upon the scope of the invention except insofar as and to the extent that they are included in the accompanying claims.

I claim:

1. A method for preparing a molded article comprising:
   a. providing a mold apparatus comprising,
      i. a mold portion having an exterior mold surface, and a perimeter edge, said exterior mold surface having a contour and a plurality of perforations; and
      ii. four separate flat table structures having an upper surface, said four separate flat table structures having no perforations for applying a vacuum and no clamps on the four separate flat table structures; said four separate flat table structures having a longitudinal axis that is oriented along at least a portion of said perimeter edge, said table structure being reversibly and controllably positionable along at least one of an x-axis, a y-axis and a z-axis relative to said perimeter edge;
   b. positioning said four separate flat table structures such that the upper surface of said four separate flat table structures are located above said perimeter edge and on a plane equivalent to the top surface of said mold portion;
   c. forming, from at least one thermoplastic composition, a heated thermoplastic sheet having a temperature that allows said heated thermoplastic sheet to be thermoformable;
   d. contacting a first portion of said heated thermoplastic sheet with at least a portion of the upper surface of one of the four flat table structures;
   e. moving said mold apparatus relative to said thermoplastic sheet to allow deployment of said thermoplastic sheet across the plane formed by the top surface of said mold portion and the remaining three separate flat table structures;
   f. moving each of the four separate flat table structures independently down along the z-axis and away from the center of said mold portion in either the x-axis or y-axis direction, allowing said four separate flat table structures to slide from underneath said thermoplastic sheet so that said thermoplastic sheet steadily drapes down under the force of gravity and across said exterior mold surface, substantially matching the contour of said exterior mold surface;
   g. drawing reduced pressure through said plurality of perforations of said exterior mold surface of said mold portion, such that the heated thermoplastic sheet substantially matches said contour of said exterior mold surface of said exterior mold portion;
   h. cooling said heated thermoplastic sheet thereby forming a shaped thermoplastic sheet that retains said contour of said exterior mold surface of said mold portion; and removing said shaped thermoplastic sheet from said first mold portion, wherein said shaped thermoplastic sheet is said molded article.

2. The method of claim 1 further comprising:
   a. melting said thermoplastic composition in an extruder thereby forming a molten thermoplastic composition, said extruder having a terminal end that is in fluid communication with a sheet die; and
   b. passing said molten thermoplastic composition through said sheet die, thereby forming said heated thermoplastic sheet.

3. The method of claim 2 wherein said mold portion and said four separate flat table structures are together moveable in a plane beneath said sheet die, and said sheet die is substantially stationary; said method further comprising moving said mold portion and said four separate flat table structures together in said plane beneath said sheet die as said thermoplastic sheet is formed, thereby facilitating contact between said heated thermoplastic sheet and said upper surface of said four separate flat table structures and said exterior mold surface of said mold portion.

4. The method of claim 3 further comprising that during the steps of contacting a first portion of said thermoplastic sheet and during the step of moving said mold apparatus relative to said thermoplastic plastic sheet a single clamp is used to clamp down the thermoplastic sheet against the first of the four separate table structures during the molding process.

5. The method of claim 1 wherein each thermoplastic composition comprises a thermoplastic material selected independently from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations.

6. The method of claim 1 wherein each thermoplastic composition comprises a reinforcing material selected independently from the group consisting of glass fibers, glass beads, carbon fibers, metal flakes, metal fibers, polyamide fibers, cellulosic fibers, nanoparticulate clays, talc and mixtures.

7. A sheet molding apparatus comprising:
   a. a mold portion having an exterior mold surface, and a perimeter edge, said exterior mold surface having a contour and a plurality of perforations; and
   b. a vacuum apparatus that is in fluid communication with said mold portion, said vacuum apparatus controllably drawing reduced pressure through said plurality of perforations of said exterior mold surface of said mold portion;
   c. four separate flat table structures having an upper surface, said four separate flat table structures having no vacuum apparatus and no perforations; said four separate flat table structures having no clamps; said four flat table structures having a longitudinal axis that is oriented along at least a portion of said perimeter edge, said table structure being reversibly and controllably positionable along at least one of an x-axis, a y-axis and a z-axis relative to said perimeter edge.

8. The sheet molding apparatus of claim 7 further comprising:
   a. an extruder having a terminal end, and
   b. a sheet die, said sheet die being in fluid communication with said terminal end of said extruder,
   c. wherein said mold portion and said four separate flat table structures are together positioned and reversibly moveable in a plane beneath said sheet die, and said sheet die is substantially stationary.

9. The sheet molding apparatus of claim 8 wherein said mold portion and said four separate flat table structures together reside on a platform, said platform being positioned and reversibly moveable in said plane beneath said sheet die.

10. The sheet molding apparatus of claim 7 further comprising:
   a. a clamp deployed on one of the four separate flat table structures; and
   b. a mechanical driver on said clamp to press down on a deposited thermoplastic sheet to hold it in place during deployment of said thermoplastic sheet across the plane of the table structures and the top of the exterior mold surface of the exterior mold portion.

\* \* \* \* \*